Feb. 25, 1964  C. N. COOPER  3,122,118
CLAMPING DEVICE FOR A SEAMER
Filed Feb. 10, 1960   5 Sheets-Sheet 1

INVENTOR
CLEVELAND N. COOPER
BY Cohn and Powell
ATTORNEYS

Feb. 25, 1964     C. N. COOPER     3,122,118
CLAMPING DEVICE FOR A SEAMER
Filed Feb. 10, 1960     5 Sheets-Sheet 2

INVENTOR
CLEVELAND N. COOPER
BY Cohn and Powell
ATTORNEYS

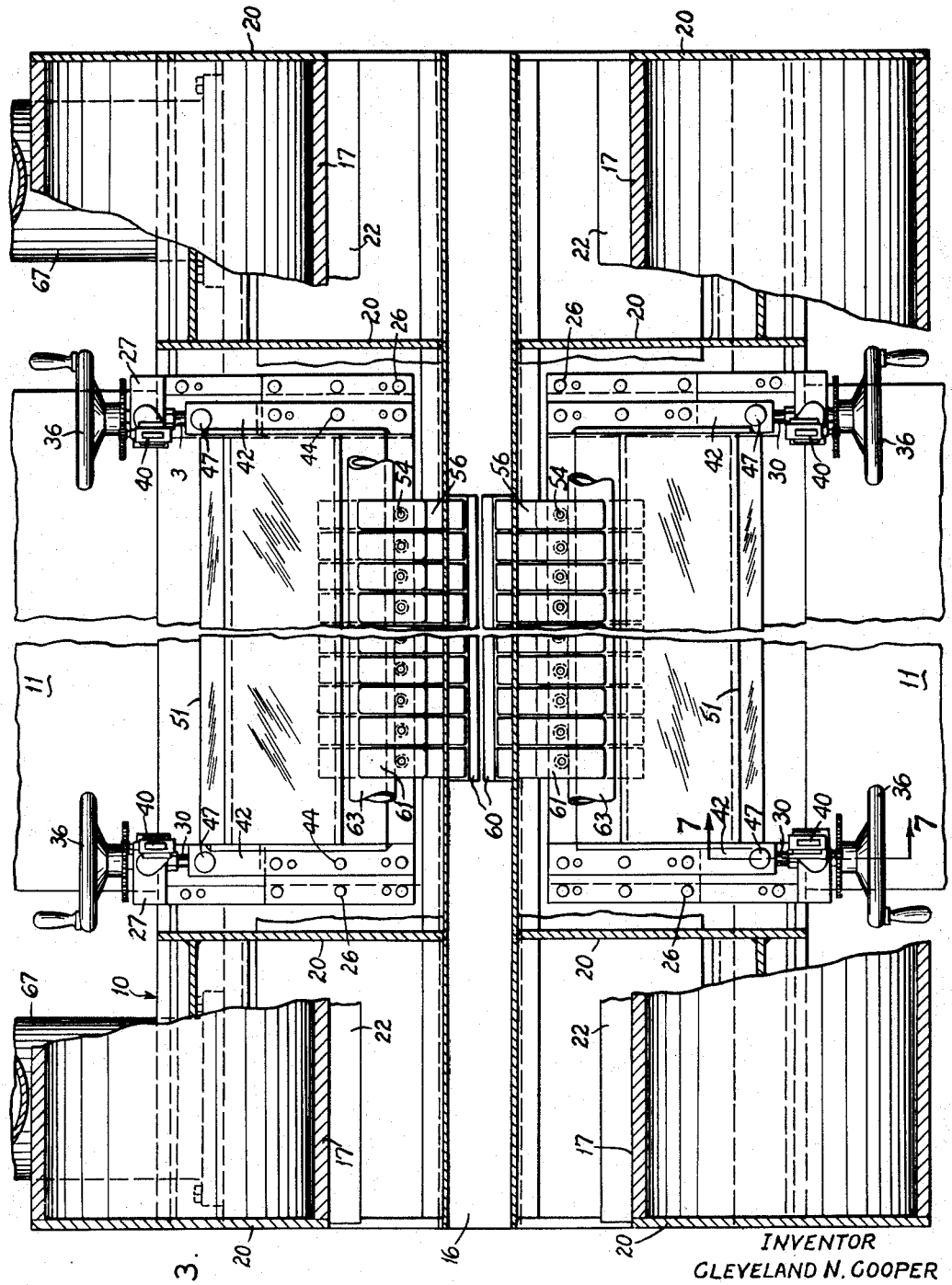

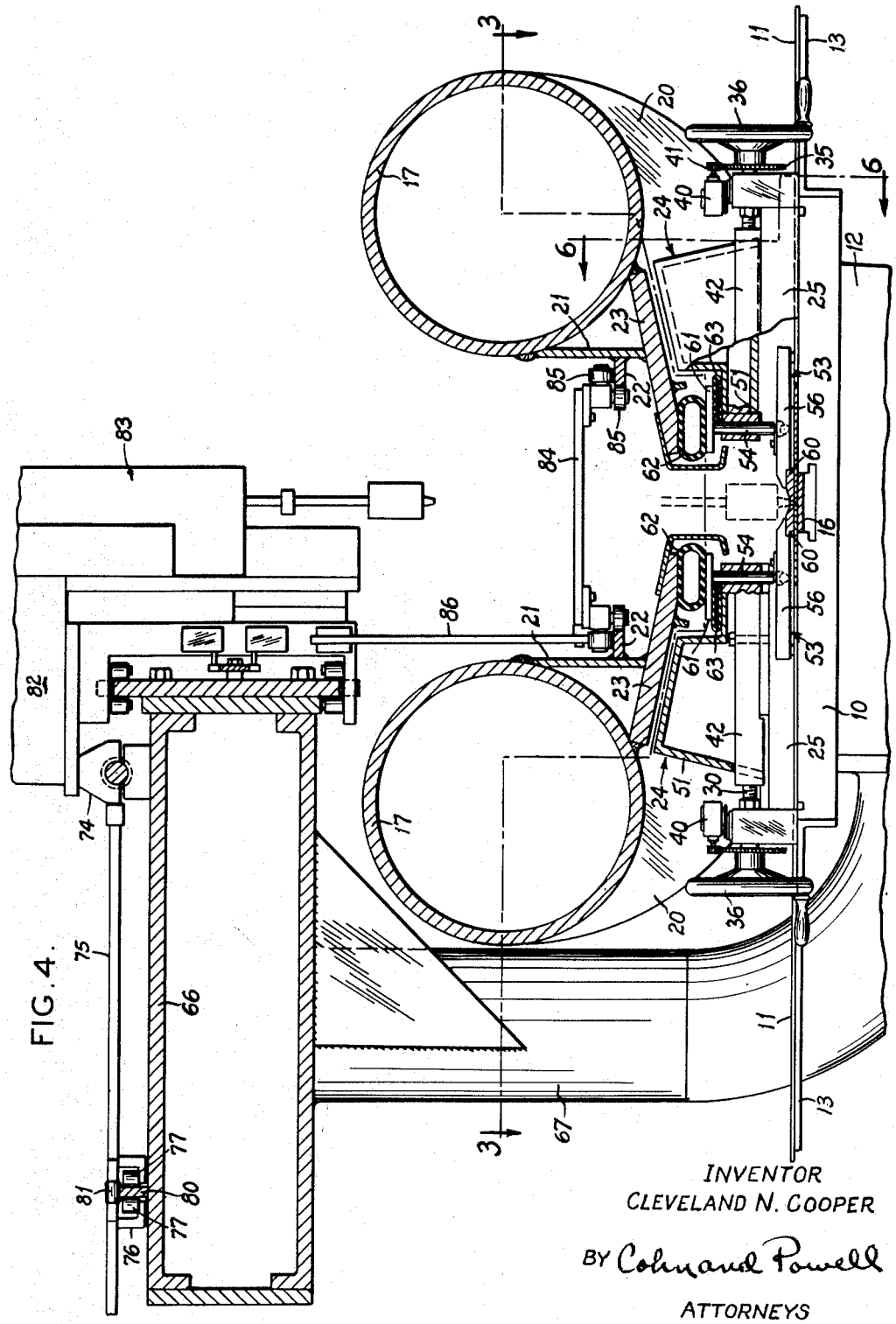

Feb. 25, 1964

C. N. COOPER 3,122,118

CLAMPING DEVICE FOR A SEAMER

Filed Feb. 10, 1960

INVENTOR
CLEVELAND N. COOPER

BY *Cohn and Powell*

ATTORNEYS

United States Patent Office 3,122,118
Patented Feb. 25, 1964

3,122,118
CLAMPING DEVICE FOR A SEAMER
Cleveland N. Cooper, Webster Groves, Mo., assignor to Pandjiris Weldment Co., St. Louis, Mo., a corporation of Missouri
Filed Feb. 10, 1960, Ser. No. 7,793
11 Claims. (Cl. 113—99)

This invention relates generally to improvements in a clamping device, and more particularly to an improved clamp for a seamer which is adapted to position work sheets in edgewise abutment to provide a joint for subsequent welding operation.

An important object of the invention is achieved by the provision of a pair of clamp guide assemblies mounted on a work table on opposite sides of a welding zone extending endwise of the table, the assemblies including means for laterally adjusting a clamp mechanism on the table relative to the welding zone so that pressure fingers engage the work sheet close to the joint to be welded.

The seamer for which this clamping device was designed, is adapted specifically to weld work sheets having a thickness within the range of 0.005 inch to 0.125 inch, and is particularly useful for fabrication in the aircraft industry. It is seen that because the work sheets are very thin, a problem exists in aligning the sheets depthwise or vertical in the same plane at a joint when the sheets are disposed horizontally on a table.

The present improved clamp device enables pressure fingers to be located as close to opposite sides of the welding joint as is possible or necessary to align and hold the sheets.

Other important advantages of the clamp device are provided by the lateral adjustability of clamp mechanisms to effectuate the holding action close to opposite sides of the joint because experience and tests have shown that the closer the pressure fingers are to the joint, the faster the feld will chill out, thereby affording greater control of the weld.

Another important object is realized by the structural connection of the clamping pressure fingers on reciprocally mounted guide rods so that the pressure fingers can swivel to adjust to the plane of the clamp-engaging surface of the work sheets and to accommodate any minor surface irregularities in such sheets.

It is a very important advantage of the clamp construction that the pressure fingers can retain work sheets in which the thickness or depth of such sheets tapers unidirectional from end to end.

Still another important object is achieved by adjustment means that enables the ends of each clamp mechanism to be independently adjusted laterally on the work table toward and away from the welding zone and hence toward and away from the joint of the work sheets. When clamping unidirectionally tapered sheets, such means enables the pressure fingers at one end of the clamp mechanism to be selectively located closer to the weld joint at that end of the work sheets having the lesser thickness dimension than the pressure fingers at the other end of the work sheets having the greater thickness dimension.

It is apparent that the clamping elements retaining sheets of tapered thickness are selectively disposed in divergent relation to the welding zone or weld joint. For the reasons discussed previously, the clamping elements must be closer to the joint formed by the thinner sheet portions in order to hold that part of the joint in vertical alignment. The reason is that the width of the weld pool at the joint progressively increases as the thickness of the sheets increases. Thus it is seen that the clamping elements holding the thicker sheet portions must be located farther away from the joint than at the thinner sheet portions so as to accommodate the wider weld pool.

Yet another important object is realized by the provision of a plurality of reciprocally mounted guide rods carrying the swiveled pressure fingers toward and away from the work table, and of a flexible hose engaging a pressure plate attached to each of the rods, the hose acting to lower the rods individually and collectively into clamping relation upon expansion. Because of the separate mounting for the guide rods, the hose can lower any of the rods a predetermined distance to cause clamping of the work sheets even though the sheets are unidirectionally tapered in thickness and require movement of the rods for different distances.

Another important objective is realized by the provision of reaction beams fixed to the ends of the table, yet unattached directly to the laterally adjustable clamp mechanisms so that any deflection of the beams is not transmitted to the clamp mechanisms and hence cannot adversely affect the accurate placement of the clamping elements adjacent the joint of the sheets in the welding zone.

An important object is to provide a clamp device for a seamer which is simple and durable in construction, economical to manufacture, efficient in operation, and capable of positioning very thin sheets for welding along a joint whether such sheets are of constant thickness or tapered in thickness unidirectionally.

The foregoing and numerous other objects and advantages of the invention will more clearly appear from the following detailed description of a preferred embodiment, particularly when considered in connection with the accompanying drawings, in which:

FIG. 3 is a top plan view of the clamping device broken away at the center and having the reaction beams cutaway to more clearly illustrate the construction of the clamp assembly as seen along staggered line 3—3 of FIGS. 2 and 4;

FIG. 4 is an end elevational view, partly shown in cross-section, as seen along line 4—4 of FIG. 1;

Figure 1:
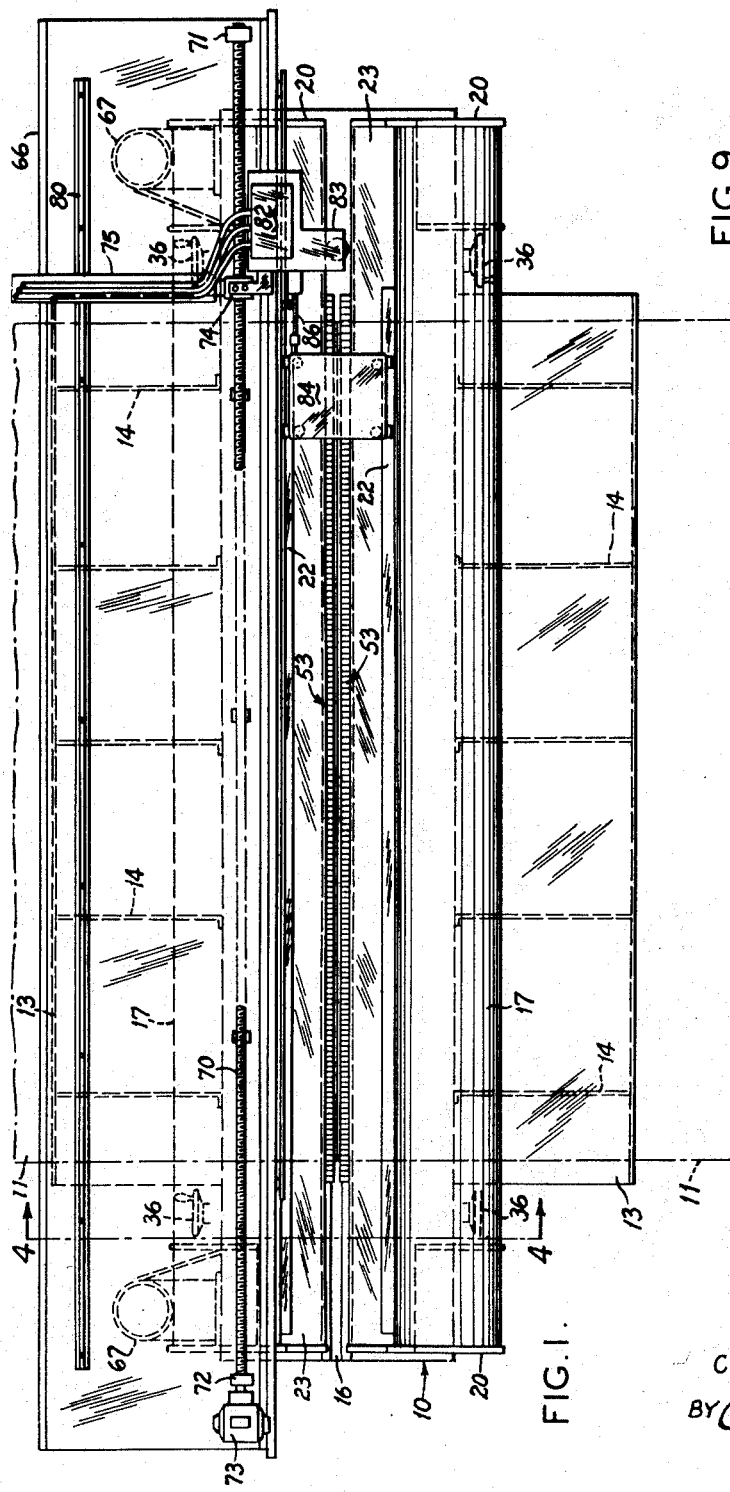
FIG. 1 is a top plan view of the seamer.
Figure 2:
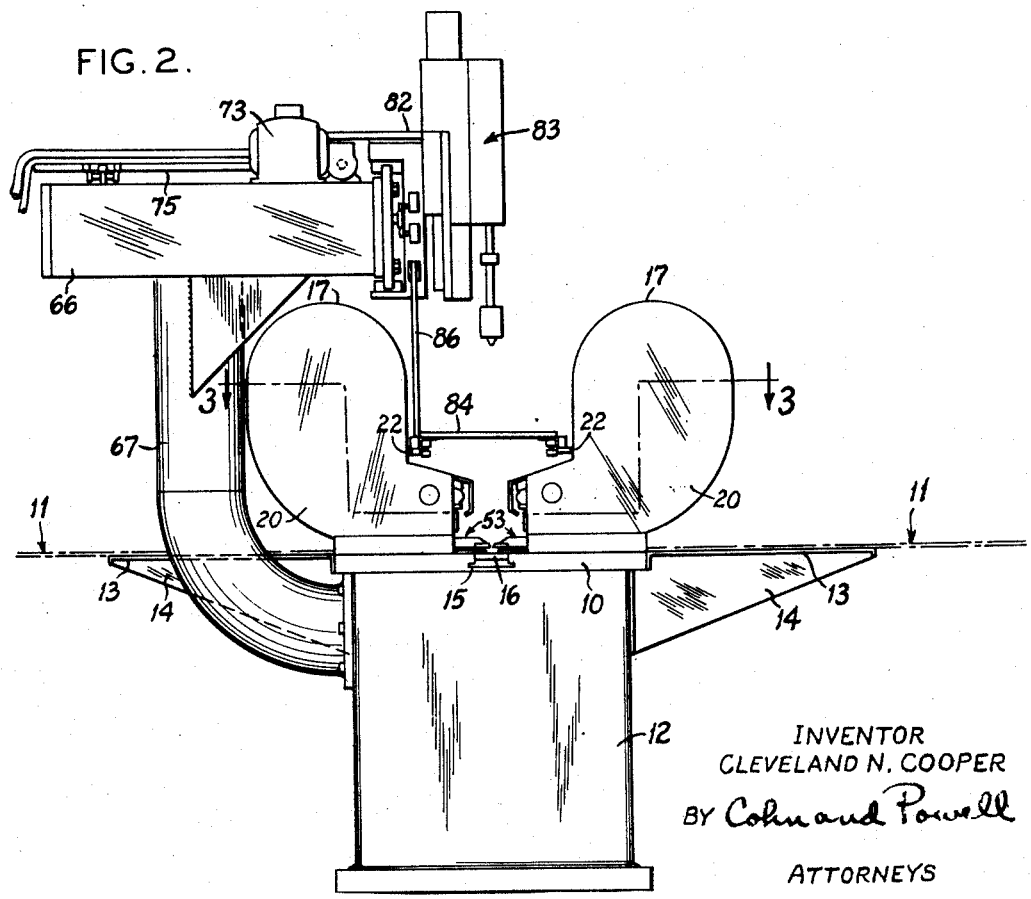
FIG. 2 is an end elevational view of the seamer as seen from the left of FIG. 1.

Referring now by characters of reference to the drawings, it is seen that the seamer includes a work table generally indicated at 10 of elongate, rectangular configuration as seen from the top plan view of FIG. 1. The table 10 is machined to provide a precisely flat surface adapted to support and position a pair of thin metal work sheets referred to at 11, during welding operation. A base indicated at 12 in FIG. 2 is attached to the table 10 and adapted to support it on a subjacent surface such as a floor.

Located at each side of the work table 10 is a work platform 13 extending longitudinally of table 10 and providing a top surface horizontally aligned with the top surface of work table 10. The platform 13 is reinforced by a plurality of braces 14 extending between and attached to the platform 13 and base 12. The platform 13 serves to support the overhanging portions of the work sheets 11 when inserted laterally onto the work table 10.

An inverted T-shaped slot 15 is formed in the top of work table 10, the slot 15 extending longitudinally from end to end of the table 10 along the center longitudinal axis. Slidably interfitted in the slot 15 is a backup bar 16 having a top surface that lies flush with the top surface of work table 10. The backup bar provides a welding zone extending endwise of table 10.

Figure 6:
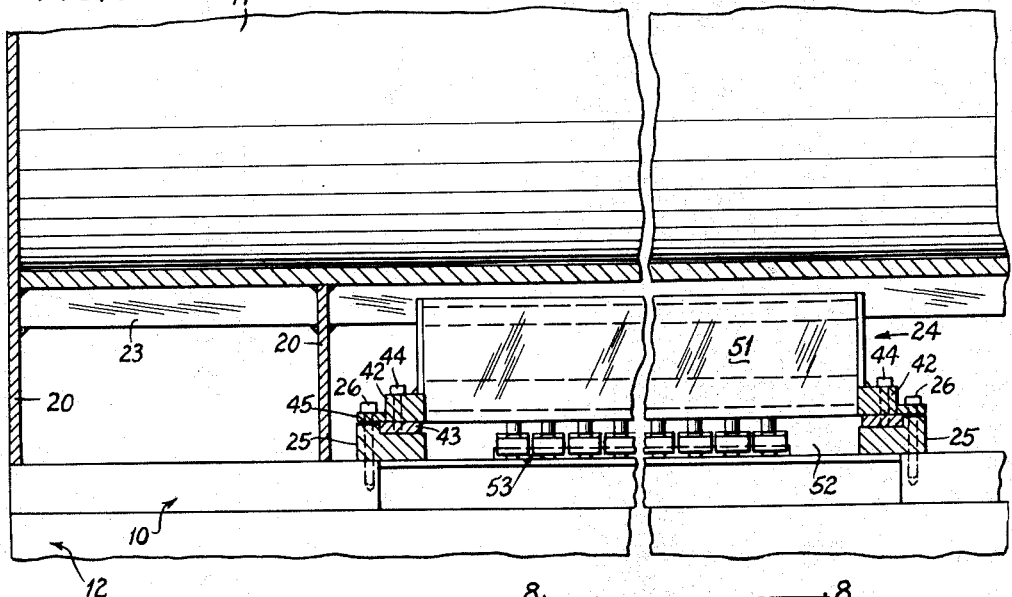
FIG. 6 is a fragmentary, cut-away view, partly in cross-section as seen along line 6—6 of FIG. 4.

A pair of reaction beams 17 is held in spaced relation above the work table 10, such beams 17 extending endwise of the table and being located with one beam 17 on each side of the welding zone 16. The cylinders constituting the reaction beams 17 are each supported by and secured to opposite ends of the work table 10 and hence to the base 12 by end plates 20, as is best illustrated in FIG. 6. It will be noted that although the ends of each reaction beam 17 are attached to the table 10, the intermediate portion of the beam 17 is spaced above the top of table 10.

Attached to the inside of each reaction beam 17 is a vertical wall 21 to which is fixed a horizontal track 22, the purpose and function of which will become apparent upon subsequent description of parts.

An inclined flange 23 is attached to each beam 17 and to the bottom margin of inside wall 21. The flanges 23 of the pair of beams 17 extend inwardly toward each other and are located on opposite sides of the welding zone. As is best seen in FIG. 6, each flange 23 extends longitudinally substantially the length of the reaction beam 17 with which it is associated.

Disposed in the space between each reaction beam 17 and the top of work table 10 is a clamp assembly 24 that is laterally adjustable transversely of the table 10 in a direction toward and away from the welding zone. The clamp assemblies 24 are identical in construction so that a detailed description of one will suffice for the other. The corresponding parts of the clamp assemblies 24 are given corresponding reference characters.

Each clamp assembly 24 includes means at each end of table 10 for independently adjusting the clamping mechanisms laterally toward and away from the welding zone. Each adjustment means include a guide plate 25 extending transversely from one side of table 10 inwardly toward the welding zone. The guide plate 25 is fixed to the top of table 10 by a plurality of bolts 26. One of the guide plates 25 is disposed immediately adjacent each inner end plate 20 connecting the reaction beam 17 to table 10, and is located in the space between one reaction beam 17 and table 10.

A thrust housing 27 is attached by bolts 28 to the outer end of guide plate 25. The thrust housing 27 serves to retain rotatively and to journal an adjustment screw 30. More particularly, a thrust member 31 is mounted in the top of housing 27 so as to swivel about a vertical axis, the thrust member 31 being retained by a cap 32 attached to the top of housing 27. It is seen from FIG. 7 that the screw 30 extends through a bore 33 formed horizontally through the center of thrust member 31, and that the screw 30 is mounted and retained by a pair of thrust bearings 34 disposed on opposite sides of thrust member 31.

Drivingly attached to that end of screw 30 which extends outwardly of thrust housing 27, is a gear 35. In addition, a hand wheel 36 is attached to the same end of screw 30 adjacent the gear 35 and is retained thereon by nut 37. The hand wheel 36 can be rotated to turn screw 30 in a manner subsequently described in detail.

Mounted on the top of thrust housing 27 is a gauge counter 40 operated by a pinion 41 that meshes with gear 35.

An elongate adjustable member 42 is attached to an elongate gib plate 43 by a plurality of bolts 44. As is best seen in FIG. 6, a retainer 45 cooperates with the guide plate 25 to form a track for slidably receiving the gib plate 43. The gib plate 43 is provided with an arcuate outer margin that laterally engages the guide plate 25 during such sliding movement. With this construction, the adjustable member 42 can be slidably moved in the track on the guide plate 25 transversely of the table 10. Each end of the clamp assembly can be independently adjusted so as to place the clamping bar 60 at a desired angle to the welding zone. If there are sixteen feet between adjustable members 42, for example, and only one member 42 is moved one inch, it is seen that the angle involved is very slight. If it is assumed that the opposite arcuate outer margins of the gib plates 43 represent peripheral segments of a cylinder, it will be apparent that the gib plates 43 can be moved in the track without any binding. There is sufficient clearance between members 42 and retainers 45 to permit this angular disposition.

Figure 7:
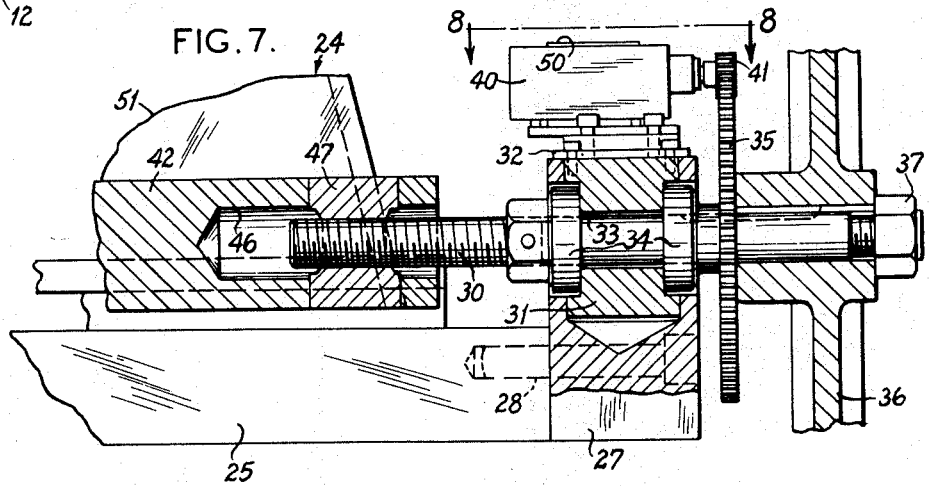
FIG. 7 is an enlarged, fragmentary cross-sectional view as seen along line 7—7 of FIG. 3.
Figure 8:
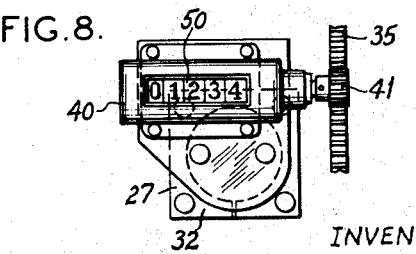
FIG. 8 is a top plan view of a gauge counter as seen along line 8—8 of FIG. 7.

From FIG. 7, it is seen that the outer end of the adjustable member 42 is provided with a longitudinal bore 46 into which the threaded end of screw 30 is received. A nut 47 is mounted in the end of adjustable member 42 so as to swivel about a vertical axis, the nut 47 extending across the bore 46 and threadedly engaging the end of screw 30.

Upon rotation of screw 30 by the hand wheel 36, the nut 47 will travel along the screw because of its threaded connection so as to adjust the position of adjustment member 42 along the guide plate 25, the gib plate 43 sliding along the track provided by guide plate 25 and retainer 45. In other words, the adjustment member 42 will be moved selectively toward and away from the welding zone upon rotation of screw 30. The dial 50 on counter 40 is calibrated by its internal mechanism and by the gear and pinion connection 35 and 41 to indicate the movement of adjustable member 42 preferably by 1000th of an inch (0.001 inch).

A rigid frame 51 extends between and is attached to the spaced adjustable members 42 of each clamp assembly 24. From FIG. 6 it is seen that the frame 51 is spaced above the table 10 to provide a lateral opening 52 into which a work sheet 11 can be inserted. In FIG. 4, it is seen that the rigid frame 51 is located below the inclined flange 23 of the reaction beam 17 associated therewith.

A plurality of reciprocating members generally indicated at 53 (FIG. 5) are mounted on and carried by the inner margin of frame 51. Each reciprocating member 53 includes a rod 54 journaled in frame 51 for reciprocating movement vertically in a direction toward and away from the work sheet 11 disposed on the top of table 10. The lower end of rod 54 is formed with a ball 55 swively connected to a pressure finger 56. A slide plate 57 attached to the pressure finger 56 interfits a groove formed in rod 54 to hold the pressure finger 56 onto the rod 54. Each pressure finger 56 is provided with a reaction button 58 adapted to seat on the work sheet 11.

It is best seen from FIG. 3 that the rods 54 are arranged in spaced relation in alignment endwise of the table 10. Moreover, the pressure fingers 56 are arranged in adjacent side-by-side relation. The inner edges of the pressure fingers 56 are interconnected by a clamp bar 60 adapted to seat on the work sheet 11 and to clamp such sheet 11 to the table top 10. It is the bar 60 that forms the innermost edge that clamps the work sheet 11 closely adjacent the weld joint provided by the abutment of a pair of sheets 11 disposed over the table 10.

The upper end of rod 54 is provided with a pressure plate 61 that is located just below the reaction beam flange 23. It will be seen from FIG. 3 that the plurality of pressure plates 61 are arranged in adjacent side-by-side relation.

Because the pressure fingers 56 are swively connected to rods 54, the pressure fingers 56 can move upon clamping engagement with the work sheet 11 to compensate for any surface irregularities or taper. Furthermore, because the pressure fingers 56 are individually operable by reason of separate rods 54, it is apparent that the pressure fingers 56 can be lowered to different heights upon clamping engagement with the work sheet 11 in order to compensate for different thicknesses in different regions of such work sheet 11.

To operate the reciprocating members 53 of each clamp assembly 24, a hydraulic operating means is employed. This hydraulic operating means includes a flexible hose 62 extending endwise of the table and located between the lower side of pressure plates 61 and the reaction beam flange 23. A coacting flexible hose 63 is located between the underside pressure plates 61 and the rigid frame 51.

In order to extend the reciprocating members 53 downwardly into clamping engagement with the work sheet 11, fluid such as oil is pumped into hose 62 to expand the hose 62 as is illustrated in FIG. 4. At the same time, the fluid from coacting hose 63 is removed so that this hose can collapse. It will become apparent that because the hose 62 is flexible, it can extend one or more of the pressure fingers 56 lower than other fingers 56 in order to compensate for different thicknesses of the work sheets or to compensate for surface irregularities.

Figure 5:
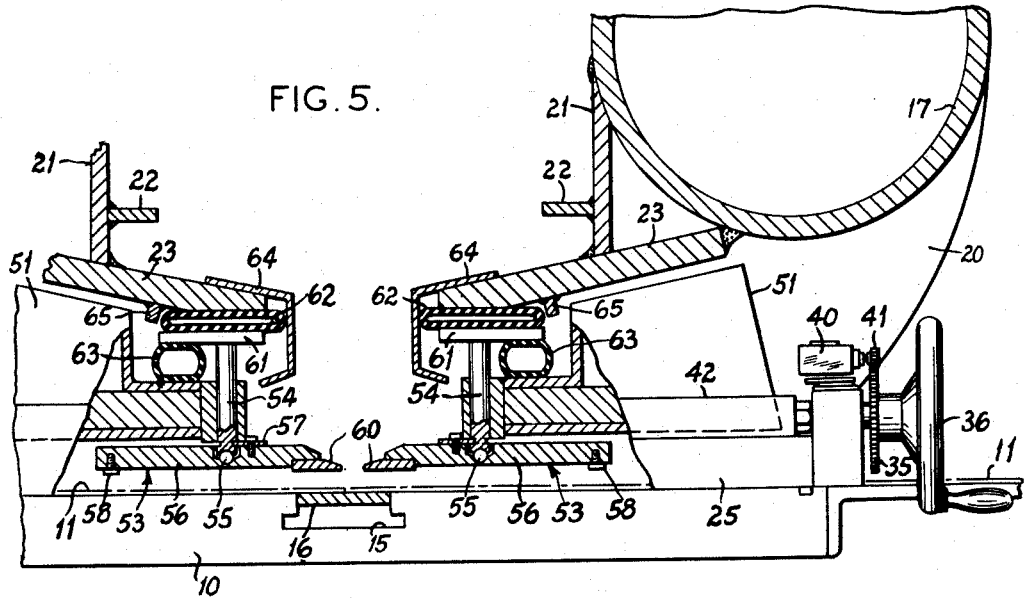
FIG. 5 is a fragmentary view, partially in cross-section, of the clamp assembly similar to FIG. 4, but illustrating the assembly in an adjusted position.

Conversely, if it is desired to raise the reciprocating members 53 and unclamp the work sheet 11, the fluid is removed from the flexible hose 62 to allow such hose to collapse as is illustrated in FIG. 5, and fluid is pumped into the coacting hose 63 in order to expand it. Upon expansion of hose 63, the hose will lift the pressure plates 62 and hence raise the reciprocating members 53.

The flexible hose 62 is retained in position on top of pressure plates 61 by a U-shaped flange 64 attached to the reaction beam flange 23 and extending lengthwise thereof, the hose-retaining flange 64 providing a reversely turned portion that embraces one side of hose 62. The opposite side of hose 62 is positioned by a longitudinal shoulder 65 attached to the bottom of reaction beam flange 23 and extending the length thereof.

The hose 63 is retained in position by the rigid frame 51 on one side and by the guide rods 54 on the opposite side.

The seamer includes welding apparatus adapted to weld the work sheets 11 together at the joint in the welding zone after the sheets have been clamped in position. This welding apparatus includes a support beam 66 extending lengthwise above one of the reaction beams 17 at one side of table 10. A tubular bracket 67 supports the beam 66 at each end, the brackets 67 being fixed to the table base 12.

Mounted on top of support beam 66 is a drive screw 70 extending endwise of the table 10. The drive screw 70 is journaled by a pillow block bearing 71 at one end of beam 66 and by a cooperating pillow block bearing 72 at the opposite end. A drive motor 73 is operatively connected to one end of drive screw 70 so as to rotate such screw.

Threadedly mounted on drive screw 70 is a traveling nut 74 that moves along the screw 70 upon screw rotation. A mounting plate 75 is attached to one side of traveling nut 74. Depending from the lower side of mounting plate 75 is a bracket 76 that carries a pair of spaced rollers 77 adapted to engage therebetween a carriage track 80 projecting upwardly from the top of support beam 66 and extending lengthwise thereof. Another roller 81 carried by the mounting plate 75 engages the top margin of track 80.

A carriage assembly 82 is fixed to and carried by the opposite side of traveling nut 74, the carriage assembly including a welding head generally indicated at 83.

The welding head 83 is moved lengthwise and endwise of the table 10 along the welding zone to provide a weld at the joint between abutting work sheets 11. The welding head 83 is actuated upon rotation of drive screw 70 by the drive motor 73. Various electrical switching mechanism (not described) is included to limit longitudinal travel of the welding head 83.

An operator's carriage platform 84 is located between the reaction beams 17 and includes rollers 85 at each side engaging the tracks 22. The operator's carriage 84 is fixed by a bracket 86 to the traveling carriage and welding head 82—83. In use, the operator kneels on the platform 84 and observes the weld as it is being formed, the platform 84 together with the carriage and welding head 82—83 moving as a unit along the seamer between the reaction beams 17.

First, it will be assumed that it is desired to weld two work sheets 11 that are of constant thickness. The reciprocating members 53 are raised by expanding the hoses 63 and simultaneously collapsing the hoses 62. Then, a work sheet 11 is inserted into each opening 52 at opposite sides of the table 10, below the rigid frame 51 and below the pressure fingers 56. These work sheets 11 are arranged in abutting relation in the welding zone above the backup bar 16, and are supported by the table 10 and work platforms 13.

The clamp assemblies 24 at opposite sides of the table 10 are individually adjusted to bring the clamping bars 60 as close to the sheet joint in the welding zone as is possible. As explained previously, the sheets welded by this seamer have a thickness within the range of 0.005 inch to 0.125 inch. Because the work sheets 11 are very thin, such sheets 11 must be clamped very close to the joint in order to assure depthwise or vertical alignment of the edges at the joint to be welded.

In addition, the distance of the clamping bars 60 from the joint depends upon the thickness of the sheets 11. If the sheets are very thin, a very small weld pool is necessary, and consequently the clamping bars 60 can be located very close to the abutting edges. As the thickness of the sheets increases, the clamping bars 60 must be spaced farther apart in order to provide room for an increased width in the weld pool necessary in welding such sheets.

As explained previously in detail upon description of parts, each end of each clamp assembly 24 can be individually and independently adjusted by manipulation of hand wheels 36 in order to adjust the lateral position of pressure fingers 53 and hence of clamping bar 60.

When the work sheets 11 are of constant thickness, the hand wheels 36 of each guide mechanism 24 are manipulated so that the clamping bars 60 are a constant distance away from the abutting sheet edges in the welding zone. Upon adjustment, the clamping bars 60 on opposite sides of the joint are maintained in parallel relation.

After appropriate positioning of the pressure fingers 53 and clamping bars 60, the flexible hoses 62 are expanded while simultaneously the hoses 63 are collapsed so as to move the rods 54 downwardly toward the work sheets, and hence clamp the pressure fingers 53 including the clamping bars 60 against the work sheets 11. The work sheets 11 are now held firmly in position on the table 10.

After clamping, the welding apparatus is utilized to form the weld of the joint located between the clamping bars 60.

Figure 10:
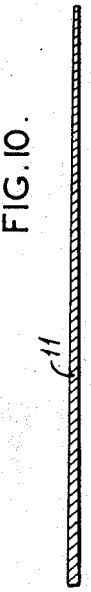
FIG. 10 is a cross-sectional view of a work sheet illustrated in FIG. 9.

If the work sheets 11 to be welded together are tapered unidirectionally in thickness as indicated in FIG. 10, the clamp assemblies 24 must be manipulated and positioned in a different manner. For example, after the tapered work sheets 11 have been positioned over the table 10 into abutting relation in the welding zone in the manner previously described, the hand wheels 36 of each assembly 24 are independently manipulated so as to move one end of the assembly 24 closer to the welding zone than the other end. As is illustrated in FIG. 10, the clamping bar 60 of each assembly 24 is located closer to the joint or weld zone where the sheets are of relatively lesser thickness than the opposite end of the bar where the thickness of the sheets is relatively greater. This arrangement is desirable for the reason that the clamping bars 60 must be as close as possible to the welding joint and yet be far enough away to allow the formation of the weld pool that will vary in width depending upon the thickness of the sheets.

Figure 9:
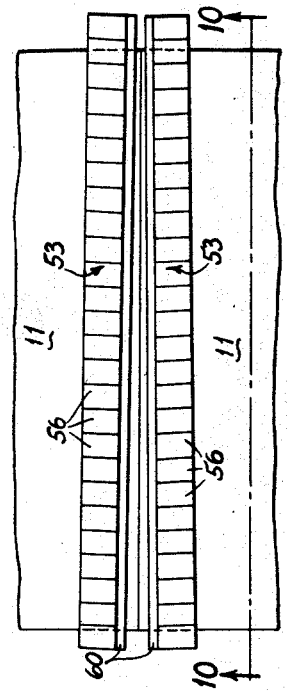
FIG. 9 is a top diagrammatic view of the clamp assemblies arranged divergently to the weld joint of unidirectionally tapered work sheets.

Because the adjustable members 42 of each clamp assembly 24 are independently adjustable laterally toward and away from the welding zone, the clamping bars 60 disposed on opposite sides of the welding zone can be arranged selectively in a divergent relation as illustrated in FIG. 9.

After the pressure fingers 53 and the clamping bars 60 have been appropriately located in divergent relation relative to the welding zone, the reciprocating members 53 are lowered into clamping relation to the work sheets 11 and table 10 by expanding hoses 62 and collapsing hoses 63 as previously described. Because the hoses 62 are flexible, such hoses lower the pressure fingers 56 successively lower from one end of the clamp assembly to the other end in order to engage clampingly the work sheets 11 and hence compensate for the unidirectional taper in thickness of such sheets.

After welding the tapered sheets 11, the reciprocating members 53 are released by expanding hoses 63 and simultaneously collapsing hoses 62. The welded resultant sheet is then removed from the top of table 10 by withdrawing it through one of the side openings 52.

It will be noted that the clamp assemblies 24 are attached to the table 10 and are laterally adjustable toward and away from the welding zone, and that the reaction beams 17 are fastened directly to opposite ends of the table 10. However, it will be apparent that the clamp assemblies 24 are not directly connected to the reaction beams 17, but are permitted to operate independently. In other words, the particular structure is such that any deflection of the reaction beams 17 is not transmitted to the clamp assemblies and hence cannot adversely affect the accurate placement of the pressure fingers 56 and bar 60 adjacent the joint of the work sheets 11 in the welding zone.

Although the invention has been described by making detailed reference to a single preferred embodiment, such detail is to be understood in an instructive, rather than in any restrictive sense, many variants being possible within the scope of the claims hereunto appended.

I claim as my invention:

1. In a clamp for a seamer, a base including a work table, a reaction beam spaced above the work table and fixed to said base, a clamp assembly including a frame free of direct engagement with said reaction beam disposed between the work table and the reaction beam, and including guide ways secured to the table at each end of the table, adjustable elements attached to the frame and slidably mounted to said guide ways, means connected to said adjustable elements for adjusting the frame laterally on said work table, a plurality of guide rods reciprocably mounted on said clamp assembly frame for vertical movement toward and away from the work table, the rods being in alignment endwise of said table, a pressure finger swiveled to one end of each rod and adapted to engage a work sheet on said table, a pressure plate secured to the other end of each rod, said reaction beam having a flange overlying the pressure plates, a flexible hose between and engaging the pressure plates and the reaction beam flange, means connected to said hose for expanding the hose so as to move the rods in a direction to clamp the work sheet between the fingers and the work table, and means operatively connected to the rods for moving the rods in the opposite direction so as to release the work sheet upon collapse of said hose.

2. In a clamp for a seamer, a base including a work table, a reaction beam spaced above and extending endwise of the work table, the reaction beam being fixed to said base, a clamp assembly including a frame free of direct engagement with said reaction beam disposed between the work table and the reaction beam, a plurality of guide ways secured to the table at each end of the table and extending laterally of said table, adjustable elements attached to the frame and slidably mounted in said guide ways, means connected to said adjustable elements for adjusting the frame laterally on said work table, a plurality of guide rods reciprocally mounted on said clamp assembly frame for vertical movement toward and away from the work table, the rods being in alignment endwise of said table, a pressure finger swiveled to one end of each rod and adapted to engage a work sheet on said table, a pressure plate secured to the other end of each rod, the pressure fingers being disposed in side-by-side abutting relation to proivde a flexible yet substantially continuous clamping surface, the pressure plates being disposed in side-by-side abutting relation, the reaction beam having a flange overlying the pressure plates, a flexible hose disposed between and engaging the pressure plates and said reaction beam flange, means connected to said hose for expanding the hose to move the rods in a direction to clamp the work sheet between the fingers and the work table, and means operatively connected to the rods for moving the rods in the opposite direction to release the work sheet upon collapse of said hose.

3. In a clamp for a seamer, a base including a work table, means providing a welding zone extending endwise of said table, a reaction beam spaced above and disposed endwise of the work table, the beam being fixed to said base, a clamp assembly including a frame free of direct engagement with said reaction beam disposed between the work table and reaction beam, guide ways secured to the table at each end of the table, the guide ways extending laterally of said table, adjustable elements attached to the frame and slidably mounted in said guide ways, a plurality of guide rods reciprocally mounted on said frame for vertical movement toward and away from said table, the rods being in alignment endwise of the table, a pressure finger swiveled to one end of each rod and adapted to engage a work sheet on said table, a rigid clamping bar interconnecting the individual pressure fingers to provide a continuous clamping edge adjacent the welding zone, a pressure plate secured to the other end of each rod, the reaction beam including a portion overlying said plates, a flexeible hose between and engaging the pressure plates and the reaction beam portion, means connected to said hose for expanding the hose to move the rods in a direction to clamp the work sheet between the fingers and the work table, means operatively connected to said adjustable elements for laterally adjusting the position of said elements on said table to place the clamping bar at a desired angle relative to said welding zone, and means operatively connected to the rods for moving the rods in the opposite direction to release the work sheet upon collapse of said hose.

4. In a clamp for a seamer, a base including a work table, means providing a welding zone endwise of said table, a reaction beam spaced above and extending endwise of said table, the beam being fixed to said base, a clamp assembly disposed between the work table and reaction beam, the clamp assembly including guide ways secured to the table at each end of the table and extending laterally of said table, adjustable members slidably mounted and connected to said guide ways, a rigid frame free of direct engagement with the reaction beam secured to and interconnecting the adjustable members, a plurality of guide rods reciprocally mounted on said frame for vertical movement toward and away from said table, said rods being in alignment endwise of the table, a pressure finger swiveled to one end of each rod and adapted to engage a work sheet on said table, a clamp bar extending between and secured to said individual fingers along one edge adjacent the welding zone, a pressure plate secured to the other end of each rod, the reaction beam including a portion overlying said plates, a flexible hose between and engaging the pressure plates and the reaction beam portion, means connected to said hose for expanding the hose to move the rods in a direction to clamp the work sheet between the fingers and the work table, means connected to each of said adjustable members for individually and selectively adjusting the position of said members laterally on said table to place the clamping bar at a desired angle relative to said welding zone, another hose engaging the other side of said pressure plates for moving the rods in the opposite direction to release the work sheet upon expansion of the last said hose and upon collapse of said first hose.

5. In a clamp for a seamer, a base including a work table, means providing a welding zone extending endwise of said table, a pair of reaction beams extending endwise of the table and fixed to the base, one of said beams being disposed at each side of said welding zone, a clamp assembly at each side of said table disposed between one of said reaction beams and said table, each clamp assembly including guide ways secured to opposite ends of the table and extending laterally, adjustable members mounted in said guide ways for lateral movement toward and away from said welding zone, and a frame free of direct engagement with its associated reaction beam rigidly interconnecting said adjustable members, a plurality of guide rods reciprocally mounted on said rigid clamp assembly frame, for vertical movement toward and away from said table, said rods being in alignment endwise of said table, a pressure finger swiveled to one end of each rod, a pressure plate attached to the other end of each rod, said reaction beam having a portion extending over said plates, a flexible hose between said plates and said reaction beam portion, means connected to said hose for expanding the hose to move the fingers toward said table, means connected to said adjustable members for laterally adjusting the position of said fingers relative to said welding zone, and means moving the fingers away from said table upon collapse of said hose.

6. In a clamp for a seamer, a base including a work table, means providing a welding zone extending endwise of said table, a pair of reaction beams extending endwise of the table and fixed to the base, one of said beams being disposed at each side of said welding zone, a clamp assembly at each side of said table disposed between one of said reaction beams and said table, each clamp assembly including a frame free of direct engagement with its associated reaction beam mounted on said table below the reaction beam for lateral movement toward and away from said welding zone, a plurality of guide rods mounted reciprocally on said clamp assembly frame for vertical movement toward and away from said table, said rod being in alignment endwise of said table, a pressure finger swiveled to one end of each rod, a pressure plate attached to the other end of each rod, a flexible hose between said plates and said reaction beam, means connected to said hose for moving the fingers toward said table upon expansion of said hose, means connected to said frame for laterally adjusting the position of said fingers relative to said welding zone, and means operatively connected to said rods for moving the fingers away from said table upon collapse of said hose.

7. In a clamp for a seamer, a base including a work table, means providing a welding zone extending endwise of said table, a pair of reaction beams extending endwise of the table and fixed to the base, one of said beams being disposed at each side of said welding zone, a clamp assembly at each side of said table disposed between one of said reaction beams and said table, each clamp assembly including a frame free of direct engagement with its associated reaction beam mounted on said table below the reaction beam for lateral movement toward and away from said welding zone, a plurality of guide rods mounted reciprocally on said clamp assembly frame for vertical movement toward and away from said table, said rods being aligned endwise of said table, a pressure finger swiveled to one end of each rod, said pressure fingers being disposed in side-by-side abutting relationship to provide a flexible yet substantially continuous clamping surface, a pressure plate attached to the other end of each rod, said pressure plates being disposed in side-by-side abutting relation, each of the reaction beams including a flange overlying the pressure plates, a flexible hose between said plates of each clamp assembly and said reaction beam flange, means connected to said hose for moving the pressure fingers toward said table upon expansion of said hose, means connected to said frame for laterally adjusting the position of said fingers relative to said welding zone, and means operatively connected to said rods for moving the fingers away from said table upon collapse of said hose.

8. In a clamp for a seamer, a base including a work table, means providing a welding zone extending endwise of said table, a pair of reaction beams extending endwise of the table and fixed to the base, one of said beams being disposed at each side of said welding zone, a clamp assembly at each side of said table disposed between one of said reaction beams and said table, each clamp assembly including a frame free of direct attachment to its associated reaction beam mounted on said table below one of the reaction beams for lateral movement toward and away from said welding zone, a plurality of guide rods mounted reciprocally on said frame for vertical movement toward and away from the table, the rods being in alignment endwise of said table, a pressure finger swiveled on one end of each rod, a pressure plate attached to the other end of each rod, a flexible hose between said plates and said reaction beam, means connected to said hose for expanding the hose to move the fingers toward said table, a clamp bar interconnecting and attached to said individually pressure fingers along one edge adjacent the welding zone to provide a substantially continuous clamping edge, means connected to said frame for laterally adjusting the position of said frame on said table to place the clamping bar at a desired angle relative to said welding zone, and means operatively connected to said rods for moving the fingers away from said table upon collapse of said hose.

9. In a clamp for a seamer, a base including a work table, means providing a welding zone extending endwise of said table, a pair of reaction beams spaced from and extending endwise of the table, the beams being fixed to the base, one of said beams being disposed at each side of said welding zone, a clamp assembly at each side of said table disposed between one of said reaction beams and said table, each clamp assembly including guide ways secured to opposite ends of the table and extending laterally toward said welding zone, adjustable members slidably mounted in said guide ways for lateral movement toward and away from said welding zone, a frame free of direct engagement with its associated reaction beam rigidly interconnecting said adjustable members, a plurality of guide rods reciprocally mounted on said frame for vertical movement toward and away from the table, said rods being in alignment endwise of said table, a pressure finger swiveled to one end of each rod, a clamp bar interconnecting and secured to said pressure fingers along one edge adjacent said welding zone, a pressure plate attached to the other end of each rod, a flexible hose between said plates and said reaction beam thereabove, means connected to said hose for expanding the hose to move the fingers toward said table, means connected to said adjustable members for selectively adjusting the lateral position of said adjustable members on said table to place the clamping bar at a desired angle and spacing relative to the welding zone, and means operatively connected to said rods for moving the pressure fingers away from said table upon collapse of said hose.

10. In a clamp for a seamer, a base including a work table, means providing a welding zone extending endwise of said table adapted to receive a pair of work sheets having their thicknesses tapered unidirectional and disposed in abutting relation on said table to form a joint in said welding zone, a pair of reaction beams spaced above the table and fixed to the base at each end of the table, one of said beams being disposed at each side of said welding zone, a clamp assembly located at each side of said table, each clamp assembly including a frame free of direct engagement with its associated reaction beam between one of the reaction beams and said table, means mounting said frame for lateral movement toward and away from said welding zone, a plurality of guide rods mounted for vertical reciprocal movement on said clamp assembly frame, a pressure finger swiveled to the bottom of each rod, a bar extending between and secured to said fingers, the bar providing an edge adapted to be located close to the joint of the work sheets at the welding zone, means connected to said frame for laterally adjusting each end of the clamp assembly frame independently so that the end of the clamping bar adjacent that end of the work sheet having the thickness of lesser dimension is disposed closer to the joint than the other end of the clamping bar adjacent that end of the work sheet having the thickness of greater dimension, a pressure plate secured to the top of each rod, a first hose disposed between each reaction beam and said plates of each clamp assembly, a second hose disposed between the plates and said frame of each clamp assembly, means for expanding and collapsing said hoses selectively and alternately, the pressure fingers and bars being urged into clamping relation to the work sheets and table upon expansion of said first hose, and being urged upwardly out of clamping relation upon expansion of said second hose.

11. The combination and arrangement of elements as recited above in claim 10, but further characterized in that the means for laterally adjusting each of the frames independently enables the clamping bars to be divergently related so that one end of the bars in the clamp assemblies on opposite sides of the welding zone is located closer to the work sheet joints than the other end of said bars.

References Cited in the file of this patent

UNITED STATES PATENTS

| | | |
|---|---|---|
| 822,775 | Schnurr | June 5, 1906 |
| 1,251,516 | Hardesty | Jan. 1, 1918 |
| 1,922,249 | Koch | Aug. 15, 1933 |
| 2,393,198 | Somerville | Jan. 15, 1946 |
| 2,399,646 | Linden | May 7, 1946 |
| 2,522,659 | Anderson | Sept. 19, 1950 |
| 2,683,433 | Shanz | July 13, 1954 |
| 2,685,625 | Peck | Aug. 3, 1954 |
| 2,941,491 | Knost | June 21, 1960 |